(12) United States Patent
Spencer

(10) Patent No.: US 9,895,963 B1
(45) Date of Patent: Feb. 20, 2018

(54) TONNEAU COVER SYSTEM WITH SINGLE PIECE SPANNING MULTIPLE PANELS

(71) Applicant: Truxedo, Inc., Yankton, SD (US)

(72) Inventor: Michael R. Spencer, Hubbard, NE (US)

(73) Assignee: Truxedo, Inc., Yankton, SD (US)

( * ) Notice: Subject to any disclaimer, the term of this patent is extended or adjusted under 35 U.S.C. 154(b) by 0 days.

(21) Appl. No.: 15/290,077

(22) Filed: Oct. 11, 2016

(51) Int. Cl.
*B60J 7/14* (2006.01)

(52) U.S. Cl.
CPC .................................... *B60J 7/141* (2013.01)

(58) Field of Classification Search
CPC ..... B60J 7/14; B60J 7/141; B60J 7/146; B60J 7/1607; B60P 7/02; B60P 7/04
USPC ............. 296/100.06, 100.08, 100.09, 136.03
See application file for complete search history.

(56) References Cited

U.S. PATENT DOCUMENTS

| | | | | |
|---|---|---|---|---|
| 4,210,361 A * | 7/1980 | Marvin | ..................... | B60J 7/068 296/100.03 |
| 4,747,441 A * | 5/1988 | Apolzer | ................... | B60J 7/041 160/206 |
| 4,844,531 A * | 7/1989 | Kooiker | .................. | B60J 7/041 296/100.09 |
| 5,087,093 A * | 2/1992 | Repetti | ..................... | B60J 7/141 296/100.09 |
| 5,427,428 A * | 6/1995 | Ericson | .................... | B60J 7/141 160/231.1 |
| 5,636,893 A * | 6/1997 | Wheatley | ................ | B60J 7/141 16/354 |
| 6,032,468 A * | 3/2000 | Fetescu | ..................... | F22G 7/14 60/653 |
| 6,352,296 B1 * | 3/2002 | Kooiker | .................. | B60J 7/141 296/100.06 |
| 6,533,343 B2 * | 3/2003 | Bohm | ..................... | B60J 7/041 296/100.02 |
| 7,484,788 B2 | 2/2009 | Calder et al. | | |
| 8,182,021 B2 | 5/2012 | Maimin et al. | | |
| 8,511,736 B2 | 8/2013 | Williamson et al. | | |
| 9,004,571 B1 * | 4/2015 | Bernardo | ................ | B60J 7/141 296/100.03 |
| 9,039,066 B1 * | 5/2015 | Yue | ........................ | B60P 7/02 296/100.09 |
| 9,211,834 B2 | 12/2015 | Facchinello et al. | | |
| 2007/0210609 A1 * | 9/2007 | Maimin | ................... | B60J 7/141 296/100.09 |
| 2010/0140973 A1 * | 6/2010 | Duncan | .................... | B60J 7/141 296/100.09 |

(Continued)

Primary Examiner — Gregory A Blankenship
(74) Attorney, Agent, or Firm — Harness, Dickey & Pierce, P.L.C.

(57) ABSTRACT

A tonneau cover including a core panel having a first panel surface, a second panel surface, and a perimeter. An upper film is bonded to the first panel surface. A lower film is bonded to the second panel surface. The tonneau cover has a first section, a second section, and a flexible hinge separating the first and second sections. The tonneau cover is foldable between a deployed arrangement where the first section and the second section are generally planar for covering the cargo box, and a folded arrangement where the first section and the second section are stacked for allowing access to the cargo box. The tonneau cover has a first thickness at the first section and the second section, and a second thickness at the flexible hinge. The second thickness is less than the first thickness.

25 Claims, 15 Drawing Sheets

(56) References Cited

U.S. PATENT DOCUMENTS

| 2016/0176448 A1* | 6/2016 | Germano | B60J 7/141 |
| | | | 296/100.09 |
| 2016/0288691 A1* | 10/2016 | Aubrey | B60R 5/045 |
| 2017/0210214 A1* | 7/2017 | Weltikol | B60J 7/141 |

* cited by examiner

TONNEAU COVER SYSTEM WITH SINGLE PIECE SPANNING MULTIPLE PANELS

FIELD

The present disclosure relates to a tonneau cover system with a single piece spanning multiple panels.

BACKGROUND

This section provides background information related to the present disclosure, which is not necessarily prior art.

Current panelized tonneau covers use multiple component extruded hinge mechanisms to allow for articulation of the tonneau covers between an open position and a closed position. Typical hinge systems involve several components including seals, perimeter channels, and adhesives for hinge joints. Assembly of such hinge systems is complex, time consuming, and costly. While current tonneau cover hinge systems are suitable for their intended use, they are subject to improvement. The present teachings advantageously provide tonneau covers with improved hinges, which overcome various shortcomings of current hinge systems.

SUMMARY

This section provides a general summary of the disclosure, and is not a comprehensive disclosure of its full scope or all of its features.

The present teachings provide for a tonneau cover for a cargo box of a truck. The tonneau cover comprises a core panel having a first panel surface, a second panel surface opposite the first panel surface, and a perimeter. An upper film is bonded to the first panel surface. A lower film is bonded to the second panel surface. The tonneau cover comprises a first section, a second section, and a flexible hinge separating the first and second sections. The tonneau cover is foldable between a deployed arrangement wherein the first section and the second section are generally planar for covering the cargo box, and a folded arrangement wherein the first section and the second section are stacked for allowing access to the cargo box. The tonneau cover further comprises a first thickness at the first section and the second section, and a second thickness at the flexible hinge. The second thickness is less than the first thickness. The flexible hinge comprises a channel formed in the core panel and the upper film overlying the channel.

The present teachings provide for another tonneau cover for a cargo box of a truck. The tonneau cover comprises a core panel having a first panel surface, a second panel surface opposite the first panel surface, and a perimeter. An upper film is bonded to the first panel surface. A lower film is bonded to the second panel surface. The tonneau cover comprises a first section, a second section, and a flexible hinge separating the first and second sections. The tonneau cover is foldable between a deployed arrangement wherein the first section and the second section are generally planar for covering the cargo box, and a folded arrangement wherein the first section and the second section are stacked for allowing access to the cargo box. The tonneau cover further comprises a first thickness at the first section and the second section, and a second thickness at the flexible hinge. The second thickness is less than the first thickness. The flexible hinge comprises a channel formed in the core panel. Each one of the upper film and the lower film overlie the channel.

The present teachings provide for an additional tonneau cover for a cargo box of a truck. The tonneau cover comprises a core panel having a first panel surface, a second panel surface opposite the first panel surface, and a perimeter. An upper film is bonded to the first panel surface. A lower film is bonded to the second panel surface. The tonneau cover comprises a first section, a second section, and a flexible hinge separating the first and second sections. The tonneau cover is foldable between a deployed arrangement wherein the first section and the second section are generally planar for covering the cargo box, and a folded arrangement wherein the first section and the second section are stacked for allowing access to the cargo box. The tonneau cover further comprises a first thickness at the first section and the second section, and a second thickness at the flexible hinge. The second thickness is less than the first thickness. The flexible hinge comprises a channel formed in the core panel. The upper film overlies the channel, and the lower film terminates on opposite sides of the channel. The channel includes an insert. The insert comprises a central region bonded to an inner surface of the upper film, and side regions bonded to a first cut edge of the first panel surface and a second cut edge of the second panel surface.

The present teachings provide for a method for forming a tonneau cover for a cargo box. The method includes sizing a core panel to conform to dimensions of the cargo box, the core panel having a first panel surface, a second panel surface opposite to the first panel surface, and a perimeter. The method also includes bonding an upper film to the first panel surface; bonding a lower film to the second panel surface; and bonding the upper film to the lower film at the perimeter. The method further includes forming a flexible hinge in the tonneau cover that separates a first section of the tonneau cover from a second section of the tonneau cover. The tonneau cover is foldable at the flexible hinge between a deployed arrangement wherein the first section and the second section are generally planar for covering the cargo box, and a folded arrangement wherein the first section and the second section are stacked for allowing access to the cargo box. The tonneau cover further comprises a first thickness at the first section and the second section, and a second thickness at the flexible hinge, the second thickness being less than the first thickness. The flexible hinge comprises a channel formed in the core panel, and the upper film overlies the channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
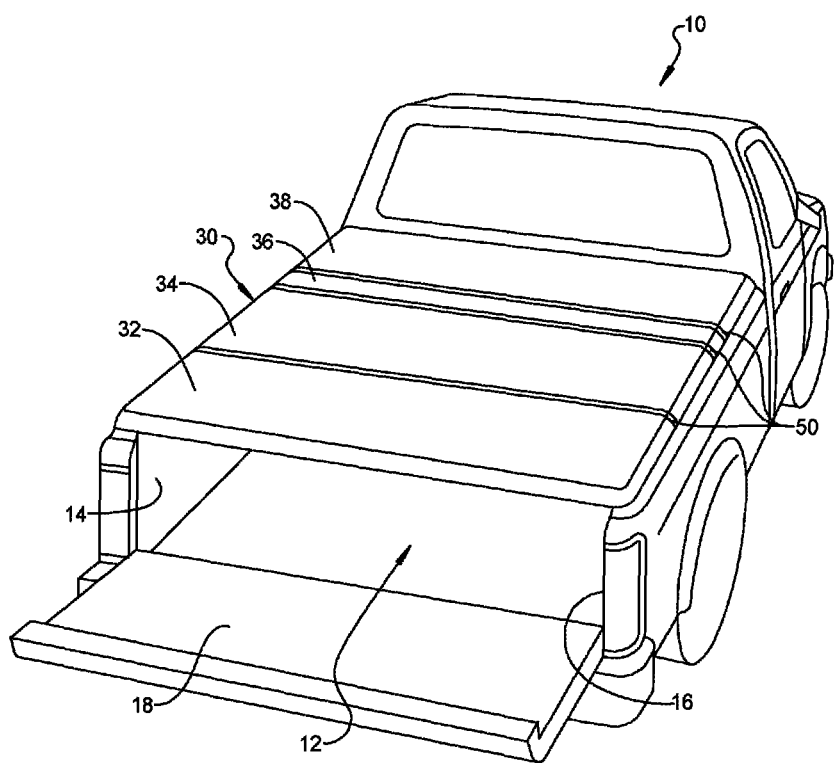
FIG. 1 is a perspective view of a vehicle including a tonneau cover according to the present teachings.

FIG. 1 illustrates a vehicle 10. The vehicle 10 can be any suitable vehicle that includes a cargo box or bed 12, such as a pickup truck. In the example illustrated, the cargo box 12 is defined by first and second sidewalls 14 and 16, a rear wall or tailgate 18, and a front wall. The cargo box 12 is covered by a tonneau cover 30. The tonneau cover 30 includes a plurality of sections, which can be arranged in an extended or deployed position (illustrated in FIG. 1) in which the tonneau cover 30 covers the cargo box 12. Any suitable number of sections can be included, such as a first section 32, a second section 34, a third section 36, and a fourth section 38. It is pointed out that, in FIG. 1, third section 36 is a spacer bar to allow sections 32, 34 and 36 to stack when folded. Between each of the sections 32, 34, 36, and 38 is a flexible or living hinge 50. The sections 32, 34, 36, 38 can be folded at the flexible hinges 50 to fold the tonneau cover 30 off of the cargo box 12 in order to permit access to the cargo box 12 from above.

Figure 2:
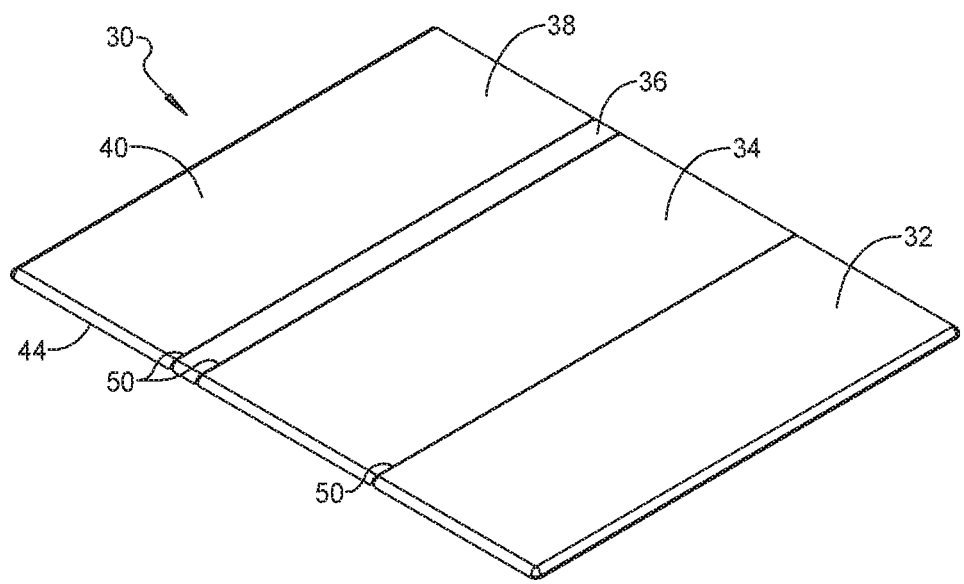
FIG. 2 is a perspective view of an upper surface of a tonneau cover according to the present teachings.
Figure 3:
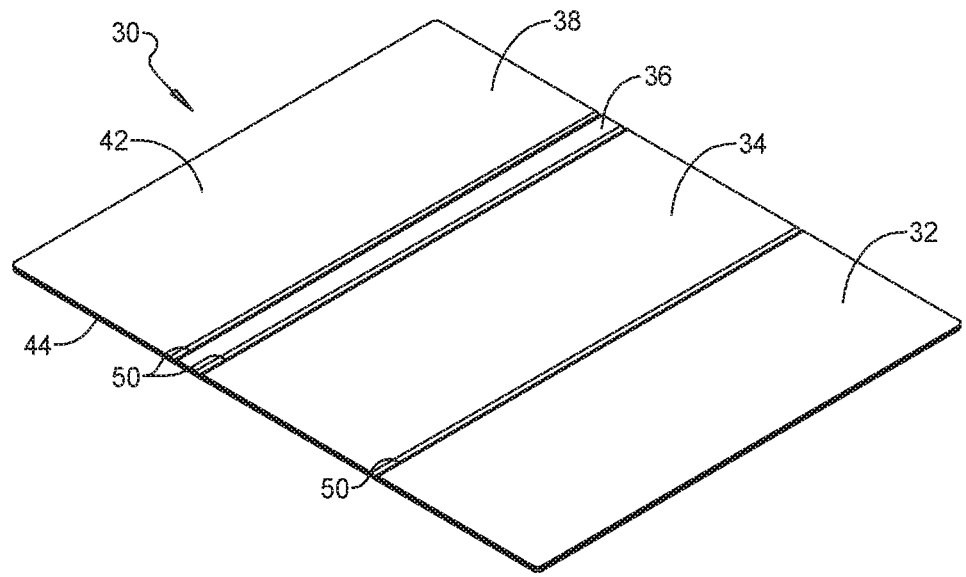
FIG. 3 is a perspective view of a lower surface of the tonneau cover of FIG. 2.

With additional reference to FIGS. 2 and 3, the tonneau cover 30 includes an upper film 40 (FIG. 2), a lower film 42 (FIG. 3), and a perimeter 44. The upper film 40 extends continuously across an upper surface of the tonneau cover 30, and the lower film 42 extends continuously across a lower surface of the tonneau cover 30. In the described example, the upper film 40 and the lower film 42 are affixed together at, or proximate to, the perimeter 44, as explained further herein.

Figure 4:
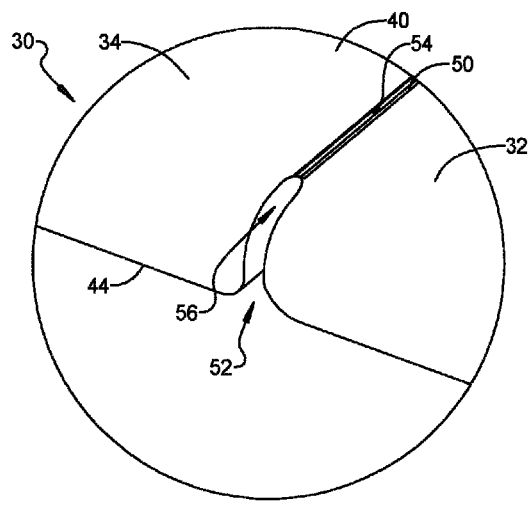
FIG. 4 is a perspective view of an upper portion of a flexible hinge of the tonneau cover illustrated in FIGS. 2 and 3.
Figure 5:
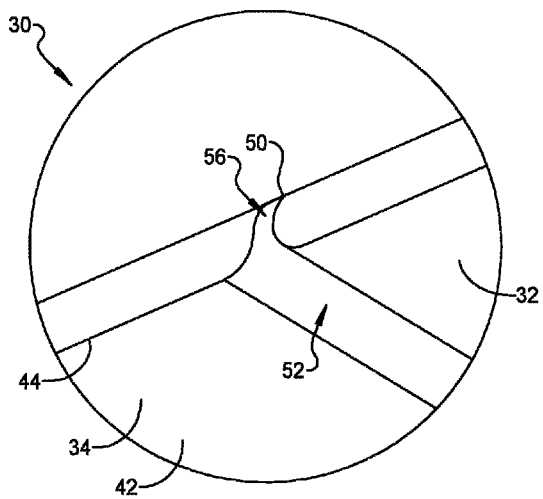
FIG. 5 is a perspective view of a lower portion of the flexible hinge of FIG. 4.
Figure 6:
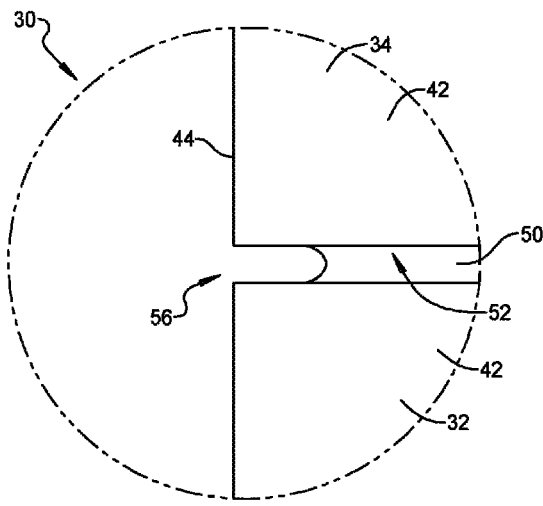
FIG. 6 is a plan view of an undersurface of the flexible hinge of FIG. 4.

With additional reference to FIGS. 4, 5, and 6, the flexible hinge 50 includes a lower channel 52. In the described embodiment, an optional upper channel 54 is also provided opposite channel 52. The lower channel 52 is defined by the lower film 42, and the upper channel 54 is defined by the upper film 40. The upper channel 54 is formed as a recess within the upper film 40. Thus both the upper film 40 and the lower film 42 extend across the flexible hinge 50. At the perimeter 44 the flexible hinge 50 defines a slot 56, which acts as a relief slot that allows the sections on opposite sides of the hinge 50 to fold relative to one another (such as the first section 32 and the second section 34 as illustrated in FIGS. 4-6).

Figure 7A:
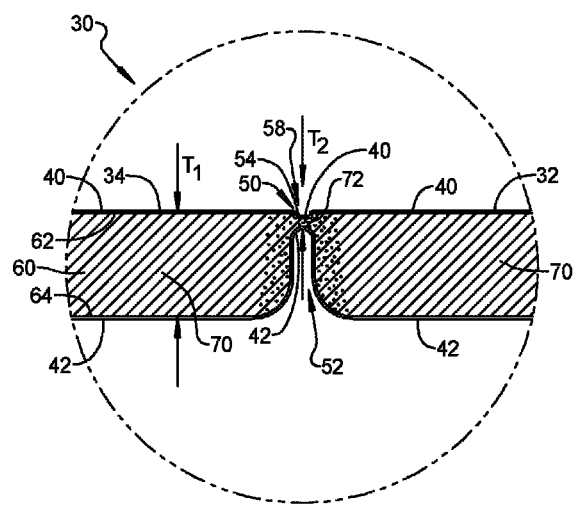
FIG. 7A is a cross-sectional view of a tonneau cover flexible hinge according to the present teachings.

With reference to FIG. 7A, the tonneau cover 30 includes a core panel 60, which has an upper or first panel surface 62, and a lower or second panel surface 64, which is opposite to the upper panel surface 62. The core panel 60 can be made of any suitable material, such as a polymeric foam material. Suitable polymeric materials include a thermoplastic material, such as polypropylene or other olefin-based compositions. The upper film 40 and the lower film 42 can each be made of any suitable material, such as polypropylene or any other suitable olefin-based composition. The upper film 40 and the lower film 42 can be bonded to the upper panel surface 62 and the lower panel surface 64 respectively in any suitable manner, such as by thermal bonding or with any suitable adhesive.

The flexible hinge 50 can be formed in any suitable manner. In the example of FIG. 7A, heat is applied to the limited region at the flexible hinge 50 without disturbing the foam condition area 70 of the core panel 60 remote from the flexible hinge 50, whereby a portion of the core panel 60 at the flexible hinge 50 is heated and pressed to a reflowed condition 72. Pressure and heat applied at the flexible hinge 50, such as by a heat press, reduces the thickness of the tonneau cover 30 at the flexible hinge 50. Specifically, on opposite sides of the flexible hinge 50, the tonneau cover 30 has a thickness $T_1$ that is greater than a thickness $T_2$ at the flexible hinge 50. After heat and pressure is applied, the slots 56 are cut, and the tonneau cover 30 is flexed and folded at the flexible hinge 50 while the portion of the core panel 60 at the flexible hinge 50 is still warm to ensure range of motion of the flexible hinge 50. The upper channel 54 is generally at a central strip 58 of the flexible hinge 50, which extends across the tonneau cover 30 between slots 56 at opposite sides of the tonneau cover 30, and is formed as the tonneau cover 30 is flexed and folded.

Figure 7B:
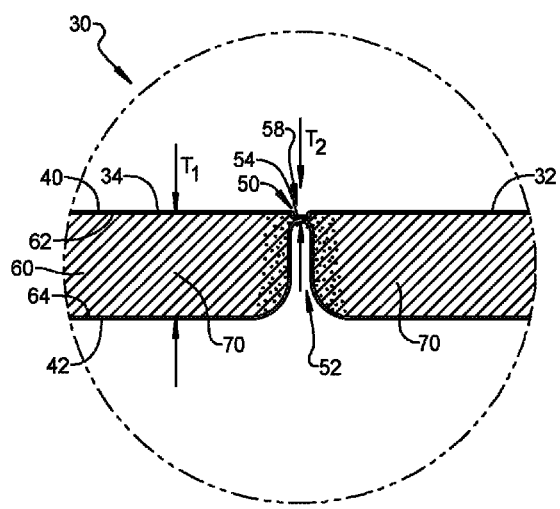
FIG. 7B is a cross-sectional view of another tonneau cover flexible hinge according to the present teachings.

In the example of FIG. 7A, the lower film 42 is spaced apart from the upper film 40 at the flexible hinge 50. However and as illustrated in FIG. 7B, the flexible hinge 50 can be formed such that the lower film 42 contacts the upper film 40. Therefore, at the second thickness $T_2$ in the example of FIG. 7B, the core panel 60, and specifically the reflowed condition 72 thereof, is not present between the films.

Figure 8A:
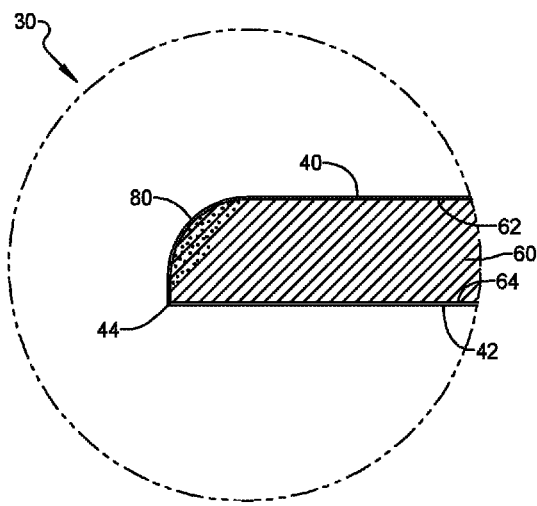
FIG. 8A is a cross-sectional view of a perimeter area of a tonneau cover according to the present teachings.
Figure 8B:
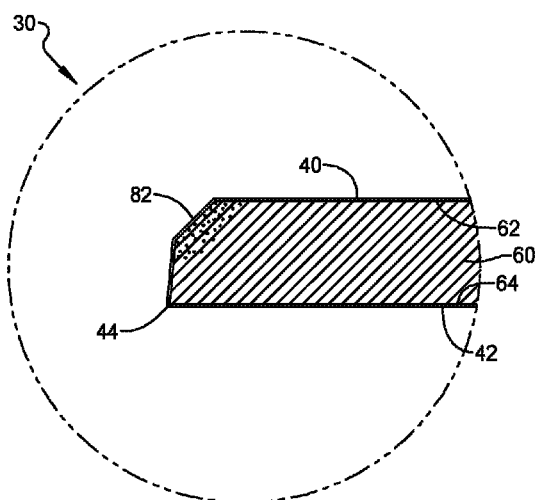
FIG. 8B is a cross-sectional view of a perimeter area of another tonneau cover according to the present teachings.
Figure 8C:
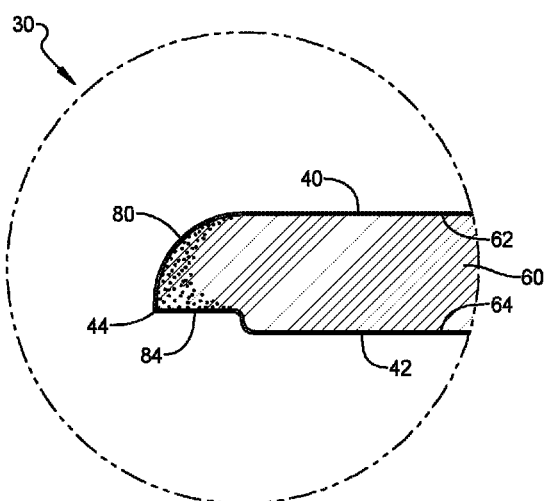
FIG. 8C is a cross-sectional view of a perimeter area of yet an additional tonneau cover according to the present teachings.

With reference to FIG. 8A, the tonneau cover 30 can include a curved edge 80 at or proximate to the perimeter 44. The curved edge 80 can be formed in any suitable manner. For example, the curved edge 80 can be formed by heat pressing the tonneau cover 30 with any suitable heat press at or proximate to the perimeter 44. As the curved edge 80 is pressed into the tonneau cover 30, heat can also be applied at the perimeter 44 in order to heat seal the upper film 40 and the lower film 42 together. Although FIG. 8A illustrates a curved edge 80, the edge can have any other suitable shape. For example and as illustrated in FIG. 8B, an upper beveled edge 82 can be formed, such as by heat pressing. With reference to FIG. 8C, a lower beveled edge 84 can be formed at or proximate to the perimeter 44 on an undersurface of the tonneau cover 30 in any suitable manner, such as by heat pressing. Any excess portions of the upper film 40 and the lower film 42 beyond the heat sealed perimeter 44 can be removed in any suitable manner, such as by milling. As explained above, the relief slots 56 at the perimeter 44 can be formed in any suitable manner, such as with any suitable trimming or milling process.

Figure 9:
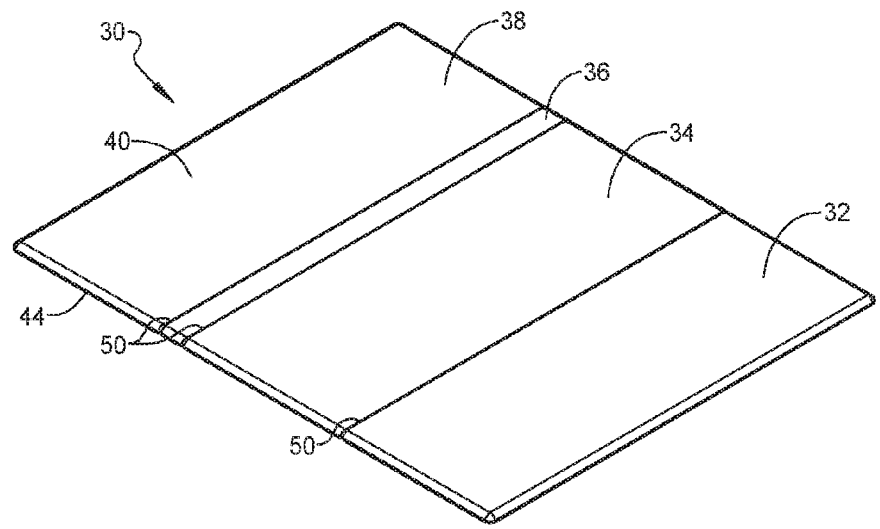
FIG. 9 is a perspective view of an upper portion of an additional tonneau cover according to the present teachings.
Figure 10:
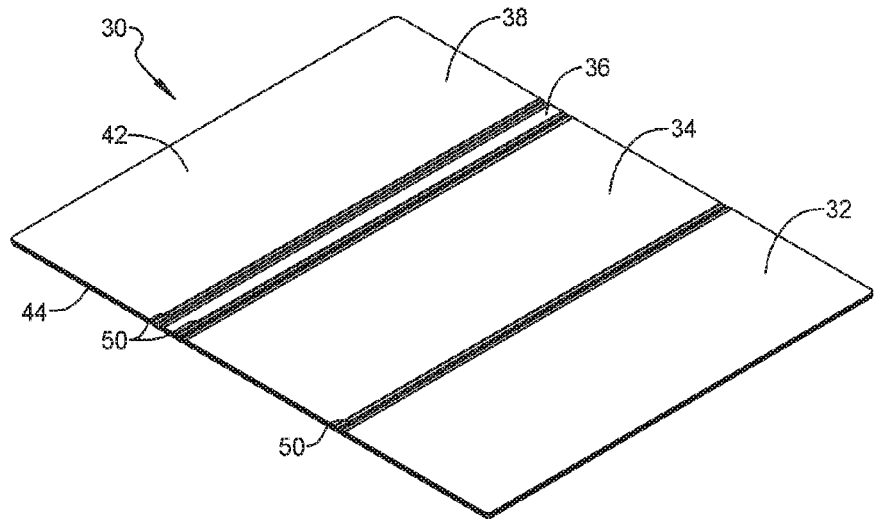
FIG. 10 is a perspective view of a lower portion of the tonneau cover of FIG. 9.
Figure 11:
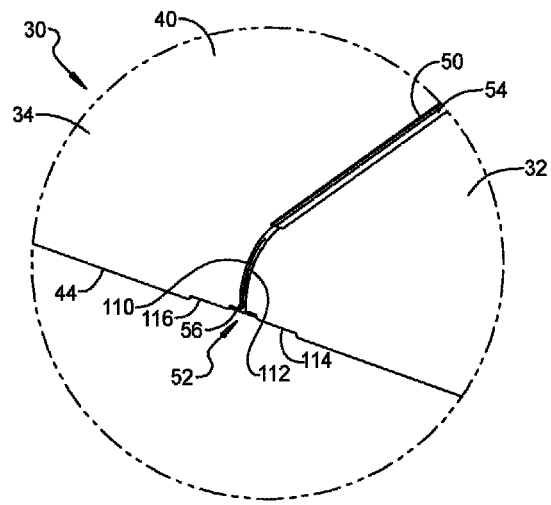
FIG. 11 is a perspective view of an upper portion of a flexible hinge of the tonneau cover of FIGS. 9 and 10.
Figure 12:
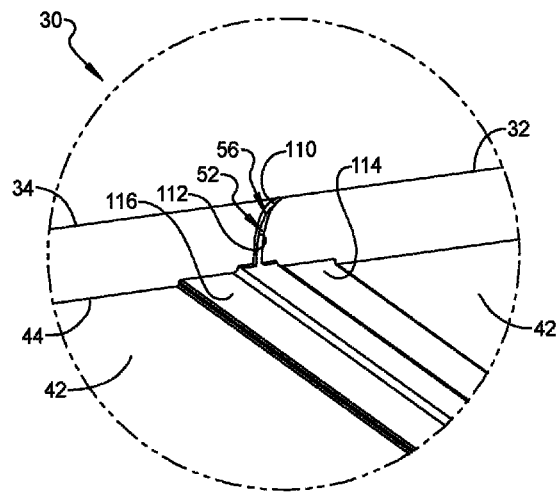
FIG. 12 is a perspective view of a lower portion of the flexible hinge of FIG. 11.
Figure 13:
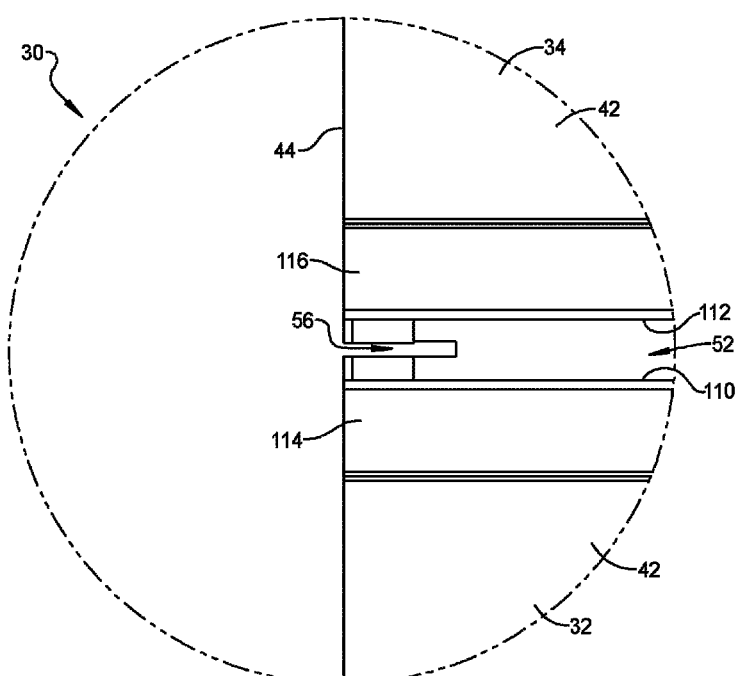
FIG. 13 is a lower plan view of the flexible hinge of FIG. 11.

FIGS. 9 and 10 illustrate the tonneau cover 30 in which the hinge 50 is formed by milling. Specifically and with additional reference to FIGS. 11-14B, the tonneau cover 30 is milled with any suitable milling device through the lower film 42 and into the core panel 60. The milling forms a first cut edge 110 and a second cut edge 112 that extend the length of the flexible hinge 50 on opposite sides of the flexible hinge 50. At the perimeter 44, the first and second cut edges 110 and 112 are relatively close together and define the slots 56. The first and second cut edges 110 and 112 extend between the slots 56 and are milled to be further apart between the slots 56.

At the flexible hinge 50 the lower film 42 is milled (see FIGS. 14A and 14B, for example), and thus the lower film 42 is not present at, and does not extend across, the flexible hinge 50 in this example. In the example illustrated, the first cut edge 110 is formed in the first section 32, and the second cut edge 112 is formed in the second section 34. The first and second cut edges 110 and 112 define the lower channel 52. The lower channel 52 is sized and shaped to accommodate an optional insert 150 (see FIG. 15 for example), as further described herein. To further accommodate the insert 150, recessed surfaces 114 and 116 (FIGS. 11, 12, 14A, and 14B for example) can be formed on opposite sides of the lower channel 52, such as by heat pressing the core panel 60 and the lower film 42.

Figure 14A:
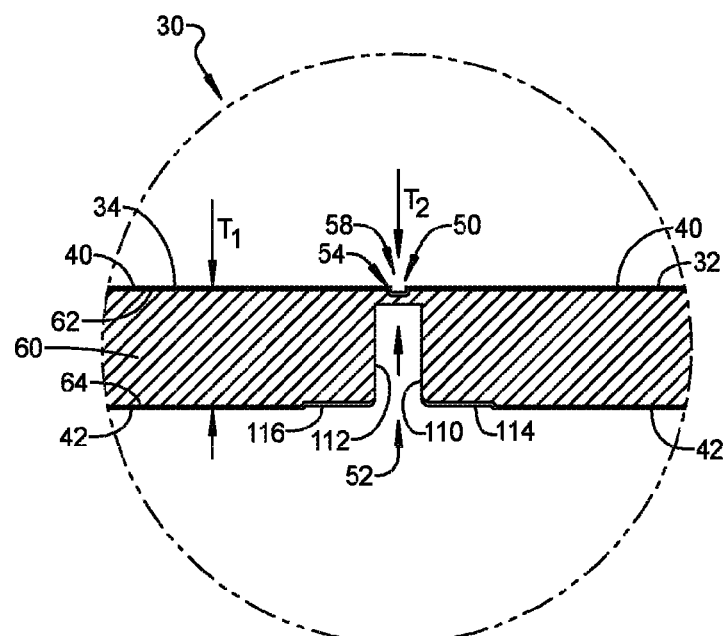
FIG. 14A is a cross-sectional view of a tonneau cover flexible hinge according to the present teachings.
Figure 14B:
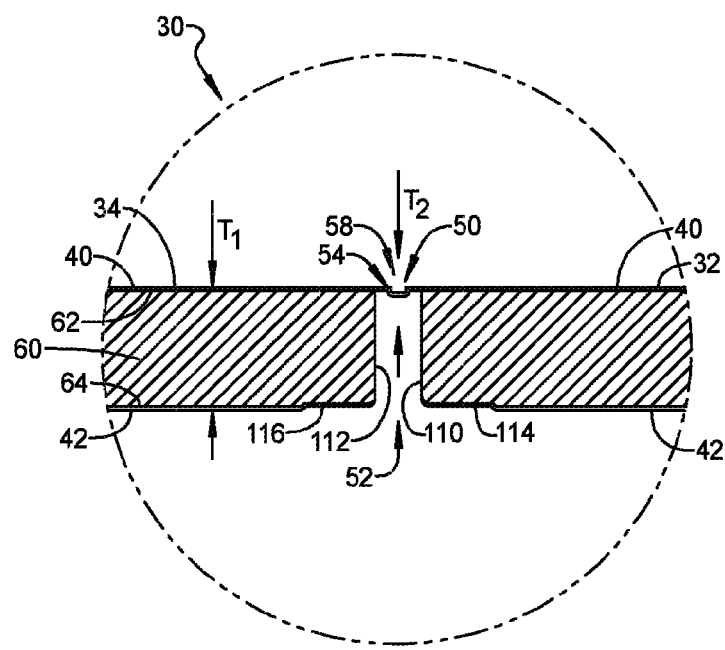
FIG. 14B is a perspective view of another tonneau cover flexible hinge according to the present teachings.
Figure 15:
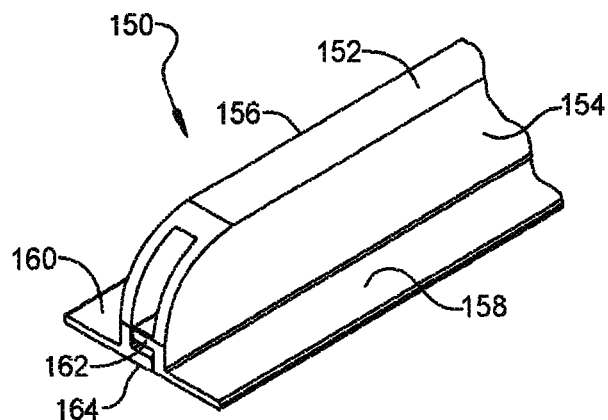
FIG. 15 is a perspective view of an insert for the flexible hinges of the tonneau cover illustrated in FIGS. 9 and 10.
Figure 16:
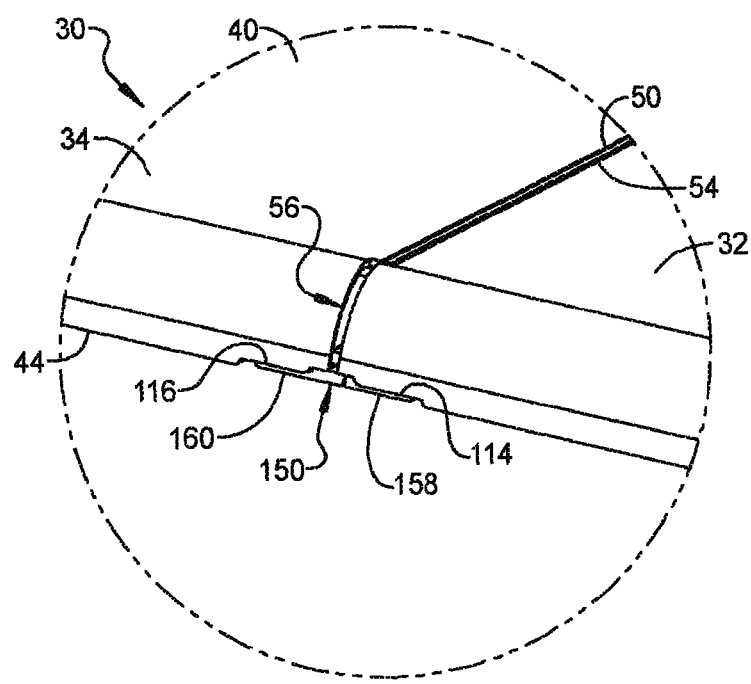
FIG. 16 is an upper perspective view of a flexible hinge of the tonneau cover illustrated in FIGS. 9 and 10 including the insert of FIG. 15.
Figure 17:
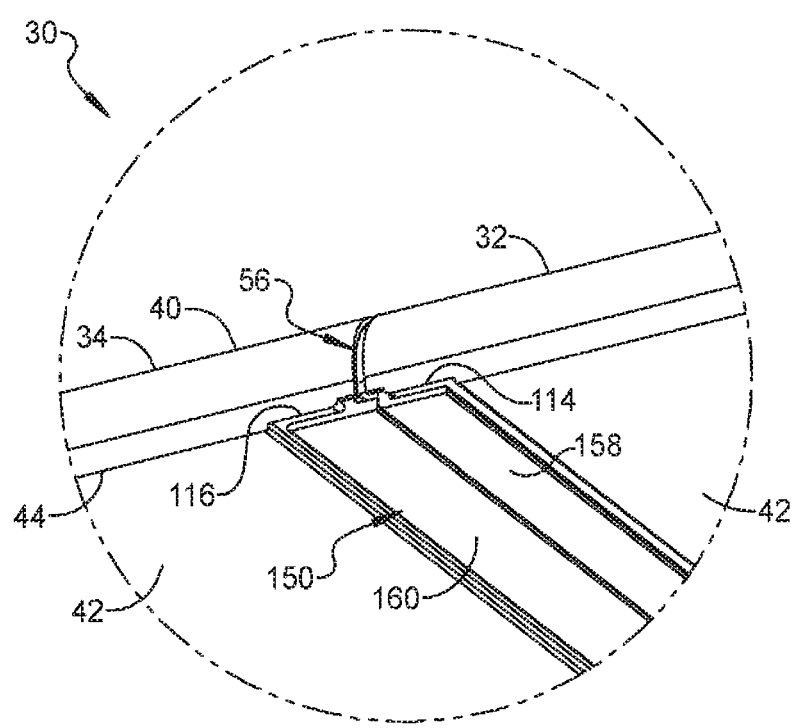
FIG. 17 is a lower perspective view of the flexible hinge of FIG. 16 with the insert of FIG. 15 seated therein.

As illustrated in FIG. 14A, the first and second cut edges 110 and 112 extend nearly to the upper film 40, but are spaced apart from the upper film 40. As a result, a small portion of the core panel 60 is opposite to the lower channel 52 of the flexible hinge 50. In the example of FIG. 14B, the first and second cut edges 110 and 112 can extend entirely to the upper film 40 such that no portion of the core panel 60 is opposite to the upper channel 54 of the flexible hinge 50.

To strengthen the milled flexible hinge 50 and to maintain alignment of the panels on opposite sides thereof, the milled flexible hinge 50 can include an insert 150, as illustrated in FIGS. 15-18B for example. The insert 150 can be any suitable support and/or alignment device made in any suitable manner. For example, the insert 150 can be an extruded flexible hinge. The insert 150 can include a central region 152, which extends between a first side region 154 and a second side region 156. Extending from the first side region 154 is a first flange 158, and extending from the second side region 156 is a second flange 160. Extending inward from the first side region 154 is a first inner spacer 162, and extending inward from the second side region 156 is a second inner spacer 164. The first and second inner spacers 162 and 164 are sized and located to engage walls 156 and 154, respectively, and position the first and second flanges 158 and 160 in a common plane when the sections 32 and 34 are in a deployed arrangement.

Figure 18A:
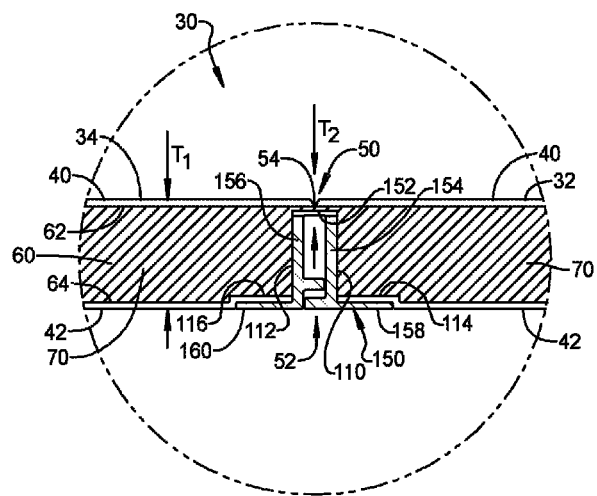
FIG. 18A is a cross-sectional view of a tonneau cover flexible hinge according to the present teachings including the insert of FIG. 15.
Figure 18B:
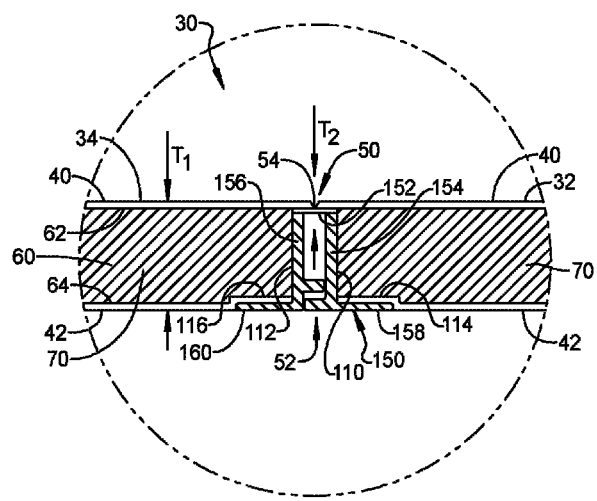
FIG. 18B is a cross-sectional view of another tonneau cover flexible hinge according to the present teachings with the insert of FIG. 15 seated therein.

The central region 152 of the insert 150 is bonded to either the portion of the core panel 60 opposite to the upper channel 54 as illustrated in the example of FIG. 18A, or directly to the upper film 40 in the example illustrated in FIG. 18B. The first side region 154 is bonded to the first cut edge 110, and the second side region 156 is bonded to the second cut edge 112. The first flange 158 is bonded to the lower film 42 of the first section 32 at recessed surface 114, and the second flange 160 is bonded to the lower film 42 of the second section 34 at recessed surface 116.

Figure 19A:
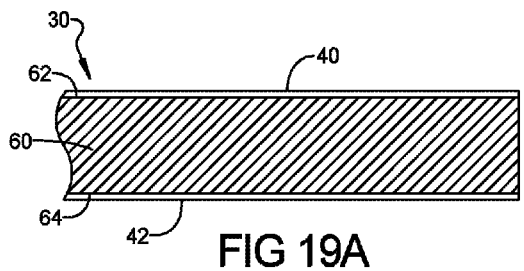
FIG. 19A is a cross-sectional view of a tonneau cover according to the present teachings prior to formation of a perimeter portion thereof.
Figure 19B:
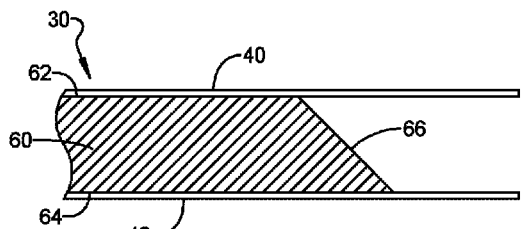
FIG. 19B illustrates the tonneau cover of FIG. 19A with a core panel thereof having been milled.
Figure 19C:
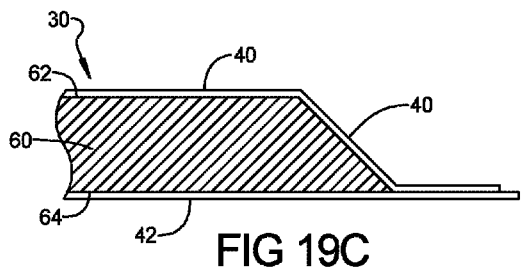
FIG. 19C illustrates the tonneau cover of FIG. 19B with an upper film thereof bonded to a lower film thereof to form a perimeter portion of the tonneau cover.
Figure 19D:
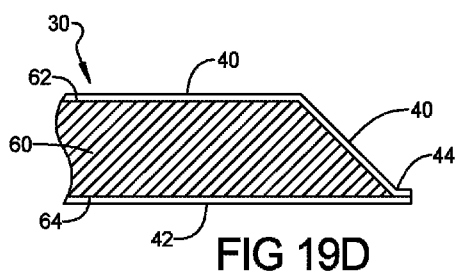
FIG. 19D illustrates the tonneau cover of FIG. 19C with portions of the upper film and the lower film beyond the perimeter having been trimmed.

With additional reference to FIGS. 19A-19D, a method for forming the perimeter 44 of the tonneau cover 30 will now be described. FIG. 19A illustrates the tonneau cover 30 with upper film 40 bonded to upper panel surface 62 of core panel 60, and the lower film 42 bonded to the lower panel surface 64 of the core panel 60. With reference to FIG. 19B, the tonneau cover 30 is generally sized and shaped to accommodate the cargo box 12, and the core panel 60 is milled in any suitable manner with any suitable milling device to provide milled surface 66. With reference to FIG. 19C, the upper film 40 is pressed over the milled surface 66 and onto the lower film 42, and sealed to the lower film 42 in any suitable manner, such as with any suitable heat press. At FIG. 19D, excess portions of the upper and lower films 40 and 42 are trimmed beyond the perimeter 44. In the example of FIGS. 19A-19D the perimeter 44 is provided with a beveled edge at the milled surface 66. However, the milled surface 66 can have any other suitable shape, such as a curved shape.

Figure 20A:
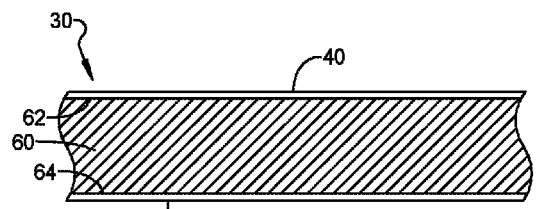
FIG. 20A is a cross-sectional view of a tonneau cover according to the present teachings prior to a flexible hinge being formed therein.
Figure 20B:
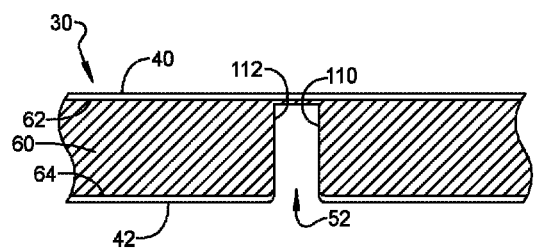
FIG. 20B is a cross-sectional view of the tonneau cover of FIG. 20A with a lower channel of a flexible hinge having been milled therein.
Figure 20C:
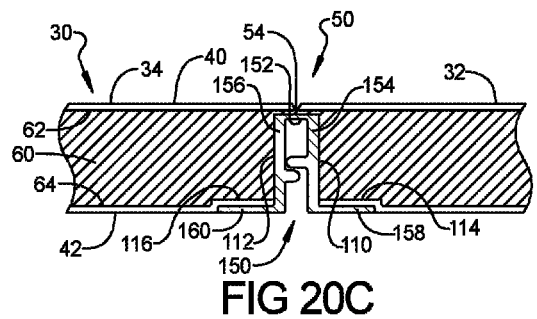
FIG. 20C is a cross-sectional view of the tonneau cover of FIG. 20B with the insert of FIG. 15 seated in the milled lower channel.

With reference to FIGS. 20A, 20B, and 20C, a method for forming the flexible hinge 50 by milling will now be described. FIG. 20 illustrates the core panel 60 of the tonneau cover 30 with the upper film 40 and the lower film 42 bonded thereto. With reference to FIG. 20B, a portion of the core panel 60 is milled to provide the first cut edge 110 and the second cut edge 112. The core panel 60 can be milled to any suitable depth. In the example of FIG. 20B, the core panel 60 is milled nearly to, but not completely to, the upper film 40. Thus, a small portion of the core panel 60 extends across the flexible hinge 50. Alternatively, and as illustrated in FIG. 18B for example, the core panel 60 can be milled completely to the upper film 40. The lower film 42 is milled at the flexible hinge 50, and thus in the example of FIGS. 20A-20C the flexible hinge 50 does not include the lower film 42.

After milling, the insert 150 is positioned within the milled area. The insert 150 is secured within the milled area in any suitable manner. For example, the central region 152 is secured to the portion of the core panel 60 extending across the flexible hinge 50 with any suitable adhesive. When the core panel 60 is completely milled through to the upper film 40, the central region 152 can be secured directly to the upper film 40 with any suitable adhesive. The first and second side regions 154 and 156 are secured to the first and second cut edges 110 and 112 respectively with any suitable adhesive. The first and second flanges 158 and 160 are secured to the recessed surfaces 114 and 116 respectively with an adhesive, or with a heat press. The upper channel 54 is formed in any suitable manner, such as by flexing the tonneau cover 30 at the flexible hinge 50.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tonneau cover for a cargo box of a truck, the tonneau cover comprising:
    a core panel having a first panel surface, a second panel surface opposite the first panel surface, and a perimeter;
    an upper film bonded to the first panel surface; and
    a lower film bonded to the second panel surface;
    wherein the tonneau cover comprises a first section, a second section, and a flexible hinge separating the first and second sections, the tonneau cover being foldable between a deployed arrangement wherein the first section and the second section are generally planar for covering the cargo box and a folded arrangement wherein the first section and the second section are stacked for allowing access to the cargo box;
    wherein the tonneau cover further comprises a first thickness at the first section and the second section, and a second thickness at the flexible hinge, the second thickness being less than the first thickness; and
    wherein the flexible hinge comprises a channel formed in the core panel and the upper film overlying the channel.

2. The tonneau cover of claim 1, wherein the core panel is formed of a thermoplastic material having a foam condition and a reflowed condition; and
    wherein the first section and the second section are comprised of the material in the foam condition and the flexible hinge is comprised of the material in the reflowed condition.

3. The tonneau cover of claim 1, wherein the flexible hinge further comprises the lower film.

4. The tonneau cover of claim 1, wherein the channel is a milled channel bordered by a first cut edge of the first panel surface and a second cut edge of the second panel surface, and the tonneau cover further comprises an insert disposed within the milled channel, the insert comprising a central region bonded to an inner surface of the upper film and side regions bonded to the first cut edge and the second cut edge.

5. The tonneau cover of claim 1, wherein the perimeter is curved, and wherein the flexible hinge comprises a slot formed at the perimeter.

6. A tonneau cover for a cargo box of a truck, the tonneau cover comprising:
   a core panel having a first panel surface, a second panel surface opposite the first panel surface, and a perimeter;
   an upper film bonded to the first panel surface; and
   a lower film bonded to the second panel surface;
   wherein the tonneau cover comprises a first section, a second section, and a flexible hinge separating the first and second sections, the tonneau cover being foldable between a deployed arrangement wherein the first section and the second section are generally planar for covering the cargo box and a folded arrangement wherein the first section and the second section are stacked for allowing access to the cargo box;
   wherein the tonneau cover further comprises a first thickness at the first section and the second section, and a second thickness at the flexible hinge, the second thickness being less than the first thickness; and
   wherein the flexible hinge comprises a channel formed in the core panel, each one of the upper film and the lower film traversing the channel.

7. The tonneau cover of claim 6, wherein the flexible hinge has a central strip whereat the upper film and the lower film are a first distance from each other, and an adjacent region on opposite sides of the central strip whereat the upper film and the lower film are a second distance from each other that is greater than the first distance.

8. The tonneau cover of claim 6, wherein the upper film and the lower film are thermally bonded together at the flexible hinge.

9. The tonneau cover of claim 6, wherein the flexible hinge has a central strip whereat the upper film and the lower film are directly bonded.

10. The tonneau cover of claim 6, wherein the core panel is formed of a thermoplastic material having a foam condition and a reflowed condition; and
    wherein the first section and the second section are composed of the thermoplastic material in the foam condition and the flexible hinge is composed of the thermoplastic material in the reflowed condition.

11. The tonneau cover of claim 6, wherein the perimeter is curved, and wherein the flexible hinge comprises a slot formed at the perimeter.

12. A tonneau cover for a cargo box of a truck, the tonneau cover comprising:
    a core panel having a first panel surface, a second panel surface opposite the first panel surface, and a perimeter;
    an upper film bonded to the first panel surface; and
    a lower film bonded to the second panel surface;
    wherein the tonneau cover comprises a first section, a second section, and a flexible hinge separating the first and second sections, the tonneau cover being foldable between a deployed arrangement wherein the first section and the second section are generally planar for covering the cargo box and a folded arrangement wherein the first section and the second section are stacked for allowing access to the cargo box;
    wherein the tonneau cover further comprises a first thickness at the first section and the second section, and a second thickness at the flexible hinge, the second thickness being less than the first thickness; and
    wherein the flexible hinge comprises a channel formed in the core panel, the upper film overlies the channel, the lower film terminates on opposite sides of the channel.

13. The tonneau cover of claim 12, wherein the channel includes an insert, the insert comprises a central region bonded to an inner surface of the upper film and side regions bonded to a first cut edge of the first panel surface and a second cut edge of the second panel surface.

14. The tonneau cover of claim 13, wherein the channel is a milled channel bordered by the first cut edge of the first panel surface and the second cut edge of the second panel surface.

15. The tonneau cover of claim 13, wherein the insert is an extruded flexible hinge.

16. The tonneau cover of claim 12, wherein the perimeter is curved, and wherein the flexible hinge comprises a slot formed at the perimeter.

17. A method for forming a tonneau cover for a cargo box, the method comprising:
    sizing a core panel to conform to dimensions of the cargo box, the core panel having a first panel surface, a second panel surface opposite to the first panel surface, and a perimeter;
    bonding an upper film to the first panel surface;
    bonding a lower film to the second panel surface;
    bonding the upper film to the lower film at the perimeter; and
    forming a flexible hinge in the tonneau cover that separates a first section of the tonneau cover from a second section of the tonneau cover, the tonneau cover is foldable at the flexible hinge between a deployed arrangement wherein the first section and the second section are generally planar for covering the cargo box and a folded arrangement wherein the first section and the second section are stacked for allowing access to the cargo box;
    wherein the tonneau cover further comprises a first thickness at the first section and the second section, and a second thickness at the flexible hinge, the second thickness being less than the first thickness; and
    wherein the flexible hinge comprises a channel formed in the core panel, and the upper film overlies the channel.

18. The method of claim 17, further comprising:
    forming the first section and the second section of the core panel with material having a foam condition; and
    forming the flexible hinge with material having a reflowed condition.

19. The method of claim 17, further comprising forming the flexible hinge such that the lower film extends across the flexible hinge.

20. The method of claim 17, further comprising:
    forming the channel by milling;
    forming a first cut edge in the first panel surface and forming a second cut edge in the second panel surface, the channel is bordered by the first cut edge and the second cut edge; and
    arranging an insert within the milled channel including bonding a central region of the insert to an inner surface of the upper film, and bonding side regions of the insert to the first cut edge and the second cut edge.

21. The method of claim 17, further comprising:
    forming the perimeter with a curved portion; and
    forming a slot at the perimeter.

22. The method of claim 17, further comprising removing a portion of the lower film at the flexible hinge.

23. The method of claim 17, further comprising bonding the upper film to the lower film at the flexible hinge.

24. The method of claim 17, further comprising heat pressing the core panel at the flexible hinge such that the core panel is thinner at the flexible hinge than on opposite sides of the living hinge.

25. The method of claim 17, further comprising milling the perimeter of the core panel, and thermally bonding the upper film and the lower film together at the milled perimeter of the core panel.

* * * * *